July 3, 1928. 1,675,641
M. CHRISTMAN
JOURNAL BOX
Filed March 1, 1927
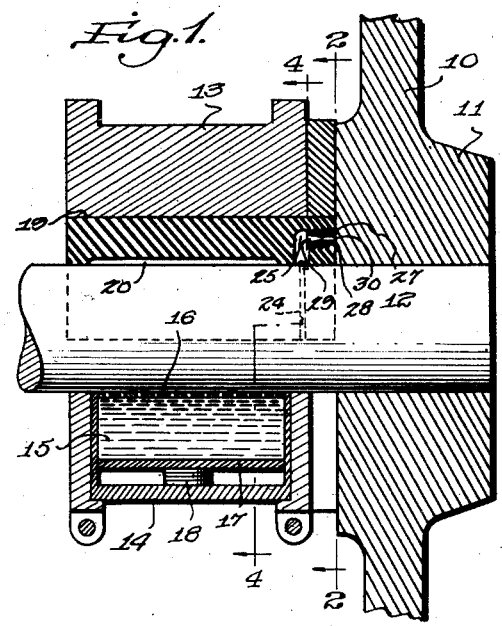
Fig. 1.
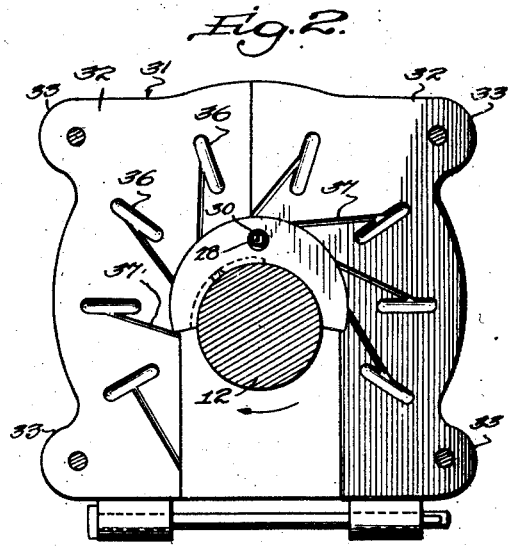
Fig. 2.
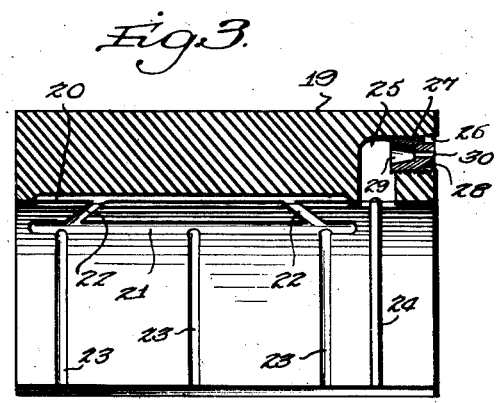
Fig. 3.
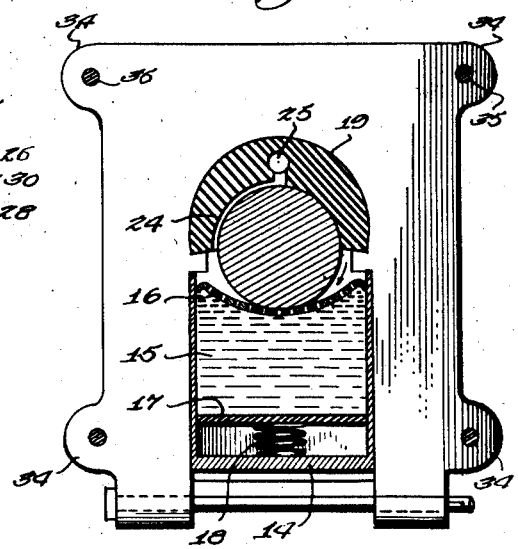
Fig. 4.
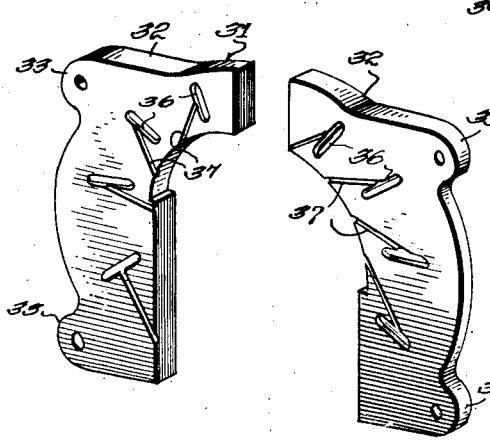
Fig. 5.
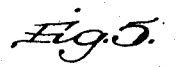
Inventor
M CHRISTMAN
By
Attorney Patented July 3, 1928.

1,675,641

UNITED STATES PATENT OFFICE.

MATTHIAS CHRISTMAN, OF SPRINGFIELD, MISSOURI.

JOURNAL BOX.

Application filed March 1, 1927. Serial No. 171,819.

This invention relates to journal boxes, and more particularly to a lubricating journal box for use on railway vehicles.

It is the present practice to provide the inner faces of brasses of journal boxes with grooves to receive and retain lubricant in contact with the axles, and such grooves terminate inwardly of the ends of the brasses to prevent loss of lubricant from the journal boxes. It has been proposed to extend such grooves to the end of the brass adjacent the hub of the wheel to supply lubricant thereto, but in practice it has been found that such a construction is wholly impracticable inasmuch as lubricant is freely fed outwardly from the end of the brass, thus rapidly using up the lubricant provided in the usual cellar and causing the axle to run dry.

An important object of the present invention is to provide novel means for supplying lubricant to the hub of the wheel without causing undue loss of the lubricant employed.

A further object is to provide a brass of the type referred to above employing a plurality of grooves for receiving and holding lubricant in contact with the axle, and to provide auxiliary and wholly independent lubricating means for supplying lubricant to the adjacent face of the hub of the wheel without causing undue loss of lubricant.

A further object is to provide a device of the character just mentioned wherein the independent lubricating means includes a groove formed in the inner face of the brass and wholly disconnected from the other lubricant grooves, the independent groove being adapted to take up a small proportion of the lubricant from the cellar and to convey such lubricant to the adjacent face of the hub of the wheel.

A further object is to provide novel means for governing the flow of the lubricant to the hub of the wheel.

A further object is to provide means associated with the journal box for collecting lubricant supplied from the independent means referred to, and adapted to retain such lubricant in proximity to the adjacent face of the hub of the wheel.

Other objects and advantages of the invention will become apparent during the course of the following description.

In the drawings I have shown one embodiment of the invention. In this showing:—

Figure 1 is a vertical longitudinal sectional view,

Figure 2 is a section on line 2—2 of Figure 1,

Figure 3 is an enlarged vertical longitudinal sectional view through the brass,

Figure 4 is a section on line 4—4 of Figure 1, and,

Figure 5 is a detail perspective of the hub plate.

Referring to the drawings, the numeral 10 indicates a wheel of a railway vehicle as a whole including a hub portion 11, and the wheel is mounted upon the usual axle 12 extending through a journal box 13. A cellar 14 is mounted in the journal box and is adapted to contain a body of relatively hard grease 15. A perforated plate 16 is mounted in the top of the cellar and contacts with the axle, the lubricant being adapted to be forced upwardly through the perforations in the plate 16 by a lower follower 17 normally urged upwardly by a spring 18.

A brass 19 is arranged in the journal box as clearly shown in Figures 1, 2 and 4. The brass 19 is provided at the crown portion of its inner surface with a groove 20 extending throughout the greater portion of the length of the brass. A second longitudinally extending groove 21 is formed in the inner face of the brass toward the rear portion thereof and parallel to the groove 20. Angular grooves 22 afford communication between the longitudinal grooves 20 and 21, as clearly shown in Figure 3. The inner face of the brass is further provided with a plurality of circumferential grooves 23 arranged at the rear portion of the brass, and the grooves 23 communicate at their upper ends with the groove 21.

As shown in Figure 3, one end of the groove 20 terminates a substantial distance from the adjacent end of the brass and in the space thus provided, an auxiliary lubricant receiving groove is formed in the rear portion of the inner face of the brass. As shown, the groove 24 is wholly disconnected from the lubricant grooves previously described. At the upper end of the groove 24, the brass 19 is provided with a lubricant receiving pocket 25, and this pocket may communicate with a threaded opening 26 extending through the adjacent end of the brass. A plug 27 is threaded in the opening 26 and is provided with a reduced polygonal end 28 adapted to be received in a suitable socket wrench. The inner end of the plug is provided with an enlarged recess 29, and a relatively small passage 30 is formed in the opposite end of the plug and communicates with the recess 29.

Referring to Figures 1, 2 and 5, the numeral 31 designates a hub liner as a whole which may be formed as a single piece or in the form of a pair of complementary sections 32. Lugs 33 are formed on the hub liner, and these lugs register with similar lugs 34 formed on the journal box, as shown in Figure 4. Bolts 35 pass through the respective lugs 33 and 34 to secure the hub liner to the journal box, as will be apparent. The outer face of the hub liner is provided with a plurality of substantially radial elongated pockets or recesses 36 adapted to receive and retain lubricant in a manner to be described. The recesses 36 communicate with relatively narrow passages 37 formed on the outer face of the hub liner, the passages 37 extending inwardly to the inner edges of the hub liner, as clearly shown in Figure 5. The passages 37 are preferably but not necessarily formed tangentially to the axle, for a purpose to be described.

The operation of the device is as follows:

The axle is adapted to rotate in a clockwise direction as viewed in Figure 2 when the vehicle is traveling forwardly. It has been found in actual practice that greater pressure is exerted under such conditions against the rear portion of the brasses of journal boxes, and accordingly the lubricant grooves are provided in the rear portion of the brass as previously stated. During rotation of the axle, lubricant will be supplied thereto by virtue of the upward pressure exerted against the body of the lubricant 15 by the follower 17, and accordingly lubricant will be fed slowly to the surface of the axle. This lubricant is carried by the axle during its rotation, thus effectually lubricating the contacting surface of the axle and brass. Lubricant thus picked up by the axle gradually accumulates in the main lubricant grooves 20, 21, 22 and 23, and these grooves are adapted to retain the lubricant and hold it in contact with the axle. A similar action takes place with respect to the supplemental groove 24, the latter collecting and retaining lubricant adjacent the end of the brass. Such lubricant serves to provide lubrication for the axle beyond the main lubricating grooves, and as the groove 24 serves to collect the lubricant, the latter gradually flows upwardly into the recess 25. From the latter recess, lubricant slowly flows outwardly through the opening 30 in the plug 27, and the lubricant thus fed from the brass will be collected by the adjacent face of the hub of the wheel. The lubricant thus collected by the wheel hub is gradually deposited into the grooves 37, and with these grooves arranged tangentially, rotation of the axle in the direction of the arrow serves to feed the lubricant outwardly to fill the pockets 36. Thus lubricant will be retained in contact with the hub of the wheel throughout the greater portion of the area thereof as the hub rotates. If it is found that the rate of flow of the lubricant through the plug 27 is too great, this plug readily may be replaced by one having a smaller passage 30 therethrough. Thus it will be apparent that the plug 27 serves as means for governing the rate of flow of the lubricant supplied to the hub of the wheel. Since the groove 24 is wholly separated from the grooves 20 to 23 inclusive, it will be apparent that there can be no passage of lubricant from the latter grooves to the groove 24, and the hub lubricating means is thus prevented from collecting lubricant which is intended to be maintained in contact with the axle by the grooves 20 to 23 inclusive.

It is to be understood that the form of the invention herewith shown and described is to be taken as a preferred example of the same and that various changes in the shapes, size and arrangement of parts may be resorted to without departing from the spirit of the invention or the scope of the subjoined claims.

I claim:

1. A journal box brass provided in its interior surface with a plurality of lubricant grooves extending throughout the greater portion of the length of the brass from a point adjacent one end to a point spaced from the opposite end, said brass being further provided in its interior surface between the last named end and the adjacent portions of said lubricant grooves with an independent supplemental lubricant groove and with passages extending from the supplemental groove to the adjacent end of the brass.

2. A journal box brass provided in its interior surface with a plurality of lubricant grooves extending throughout the greater portion of the length of the brass from a point adjacent one end to a point spaced from the opposite end, said brass being further provided in its interior surface between the last named end of the brass and the adjacent portions of said lubricant grooves with a supplemental lubricant groove wholly independent of said first named grooves, said brass further being provided in its upper portion with a pocket communicating with said supplemental groove and with a passage communicating between said pocket and the adjacent end of the brass.

3. A journal box brass provided in its interior surface with a plurality of lubricant grooves extending throughout the greater portion of the length of the brass from a point adjacent one end to a point spaced from the opposite end, said brass being further provided in its interior surface between the last named end of the brass and the adjacent portions of said lubricant grooves with a supplemental lubricant groove wholly independent of said first named grooves, said brass further being provided in its upper portion with a pocket communicating with said supplemental groove and with a passage communicating between said pocket and the adjacent end of the brass, and means for governing the flow of lubricant through said passage.

4. A journal box brass provided in its interior surface with a plurality of lubricant grooves extending throughout the greater portion of the length of the brass from a point adjacent one end to a point spaced from the opposite end, said brass being further provided in its interior surface between the last named end of the brass and the adjacent portions of said lubricant grooves with a supplemental lubricant groove wholly independent of said first named grooves, said brass further being provided in its upper portion with a pocket communicating with said supplemental groove and with a passage communicating between said pocket and the adjacent end of the brass, and a removable plug arranged in said passage, said plug being provided with a relatively small passage extending therethrough.

5. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided with an independent supplemental lubricant groove arranged between the wheel and the adjacent portions of said first named grooves and adapted to collect lubricant from the surface of the axle and deliver it to the hub of the wheel.

6. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided with an independent supplemental lubricant groove arranged between the wheel and the adjacent portions of said first named grooves and with a passage adapted to convey lubricant from said supplemental groove to the hub of the wheel.

7. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided above the axle with an independent supplemental lubricant groove arranged between the wheel and the adjacent portions of said first named grooves and with a passage adapted to convey lubricant from said supplemental grove to the hub of the wheel, and means for governing the flow of lubricant through said passage.

8. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided above the axle with an independent supplemental lubricant groove arranged between the wheel and the adjacent portions of said first named grooves and with a passage adapted to convey lubricant from said supplemental groove to the hub of the wheel, and a plug removably mounted in said passage and provided with a relatively small passage extending therethrough.

9. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided with an independent supplemental lubricant groove arranged between the wheel and the adjacent portions of said first named grooves and with a passage adapted to convey lubricant from said supplemental groove to the hub of the wheel, and a hub liner having one face adapted to contact with the hub of the wheel and provided with a plurality of lubricant receiving recesses.

10. A device of the character described comprising a journal box, a brass mounted in said journal box and adapted to receive an axle having a wheel including a hub mounted thereon and arranged adjacent one end of the brass, means for supplying lubricant to the axle, the interior surface of said brass being provided with a plurality of grooves extending throughout the greater portion of the length of the brass from a point spaced from the last named end thereof to a point adjacent the other end, said brass further being provided with a supplemental lubricant groove arranged between the wheel and the adjacent portions of said first named grooves and with a passage adapted to convey lubricant from said supplemental groove to the hub of the wheel, and a hub liner having one face adapted to contact with the hub of the wheel and provided with a plurality of lubricant receiving recesses, the face of said hub liner adjacent the wheel being provided with a plurality of grooves extending from said recesses to the inner edge of the hub liner and arranged tangentially with respect to the axle.

11. A device of the character described comprising a journal box, a lubricant cellar carried by said journal box, a brass mounted in said journal box and adapted to receive an axle having a wheel including a hub mounted thereon and arranged adjacent one end of the brass, a perforate plate arranged in the upper portion of said cellar and contacting with the axle, means normally urging the lubricant upwardly against said plate, the interior surface of said brass being provided with a plurality of grooves extending throughout the greater portion of the length of the brass from a point spaced from the last named end thereof to a point adjacent the other end, said brass further being provided with an independent supplemental lubricant groove arranged between the wheel and the adjacent portions of said first named grooves and adapted to collect lubricant from the surface of the axle and deliver it to the hub of the wheel.

In testimony whereof I affix my signature.

MATTHIAS CHRISTMAN.